US009740216B2

(12) United States Patent
Morita

(10) Patent No.: US 9,740,216 B2
(45) Date of Patent: Aug. 22, 2017

(54) AIR-CONDITIONING CONTROL SYSTEM, AND METHOD FOR CONNECTING CONTROL DEVICE AND OPERATING TERMINAL

(71) Applicant: DENSO WAVE INCORPORATED, Chita-gun, Aichi-pref. (JP)

(72) Inventor: Yuya Morita, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 420 days.

(21) Appl. No.: 14/584,225

(22) Filed: Dec. 29, 2014

(65) Prior Publication Data

US 2015/0185742 A1 Jul. 2, 2015

(30) Foreign Application Priority Data

Dec. 27, 2013 (JP) ................. 2013-272143

(51) Int. Cl.
*G05B 19/04* (2006.01)
*G05B 19/18* (2006.01)
*G05B 13/00* (2006.01)
*G05B 15/00* (2006.01)
*G06K 9/00* (2006.01)
*G06F 15/173* (2006.01)
*H04M 3/42* (2006.01)
*G05D 23/19* (2006.01)
*F24F 11/00* (2006.01)

(52) U.S. Cl.
CPC ........ *G05D 23/1902* (2013.01); *F24F 11/006* (2013.01); *F24F 2011/0067* (2013.01); *F24F 2011/0071* (2013.01)

(58) Field of Classification Search
CPC ............. F24F 11/006; F24F 2011/0067; F24F 2011/007; G05D 23/19021
USPC ........................................................ 700/276
See application file for complete search history.

(56) References Cited

U.S. PATENT DOCUMENTS

2010/0325270 A1* 12/2010 Ishizaka ............... F24F 11/0086
709/224
2013/0301870 A1* 11/2013 Mow ..................... G06T 1/0021
382/100
2015/0156266 A1* 6/2015 Gupta ..................... H04L 67/12
709/224

(Continued)

FOREIGN PATENT DOCUMENTS

JP      A-2008-215637       9/2008

*Primary Examiner* — Mohammad Ali
*Assistant Examiner* — MD Azad
(74) *Attorney, Agent, or Firm* — Oliff PLC

(57) ABSTRACT

The air-conditioning control system includes an air-conditioning controller and a server. The air-conditioning controller is connected to an air-conditioning unit and controls the air-conditioning unit. The server is connected to the air-conditioning controller by a communication network. The air-conditioning controller includes a display unit and a control unit. The display unit displays an image that includes setting information required to connect an operating terminal and the air-conditioning controller via the server. The control unit causes the operating terminal to acquire the image displayed in the display unit by capturing the image using a camera provided in the operating terminal and to connect to the air-conditioning controller via the server, based on the setting information included in the acquired image.

6 Claims, 9 Drawing Sheets

(56) References Cited

U.S. PATENT DOCUMENTS

2016/0182704 A1\* 6/2016 Minezawa .......... H04L 12/2818
  455/420
2017/0023271 A1\* 1/2017 Nabeshima .......... F24F 11/0012

\* cited by examiner

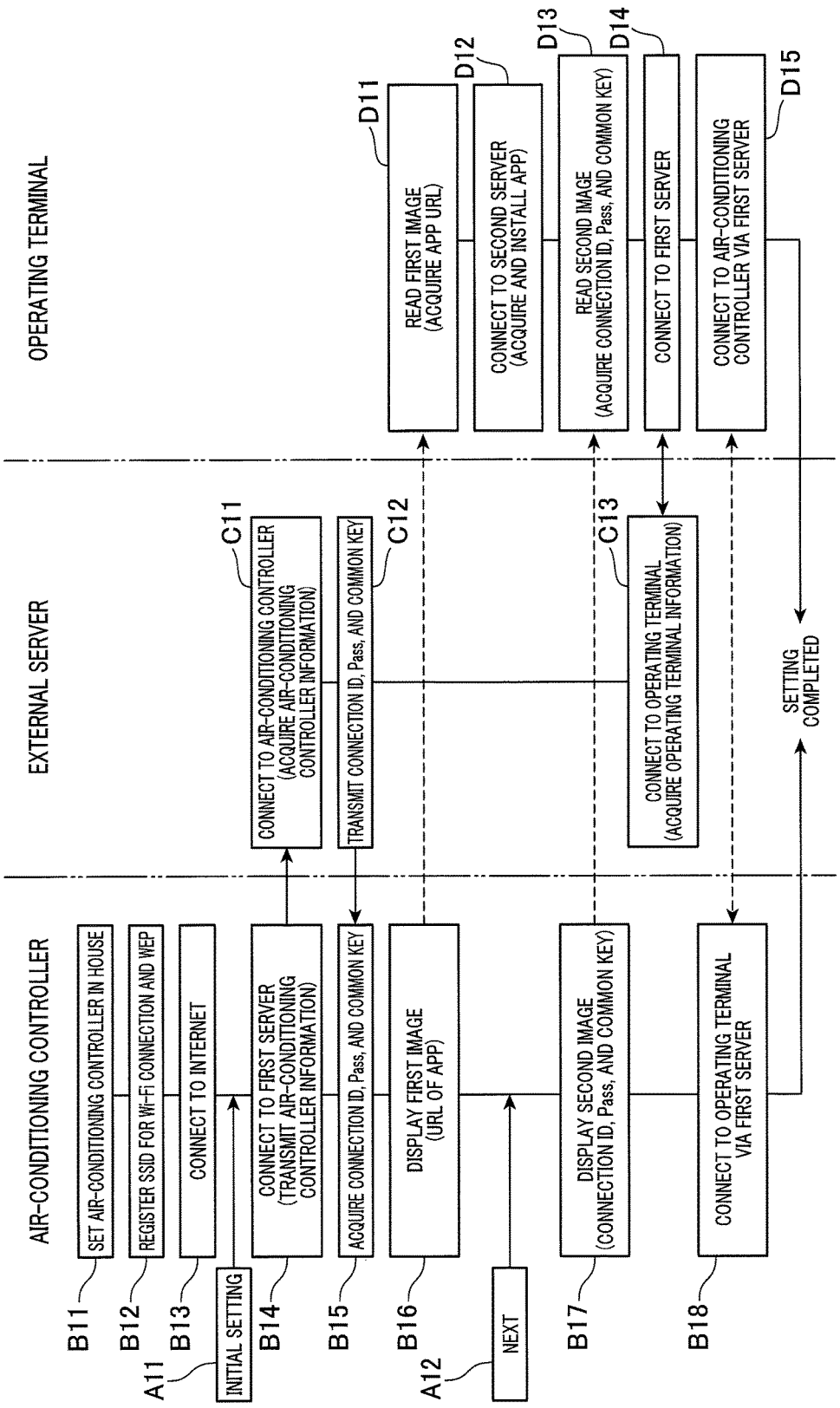

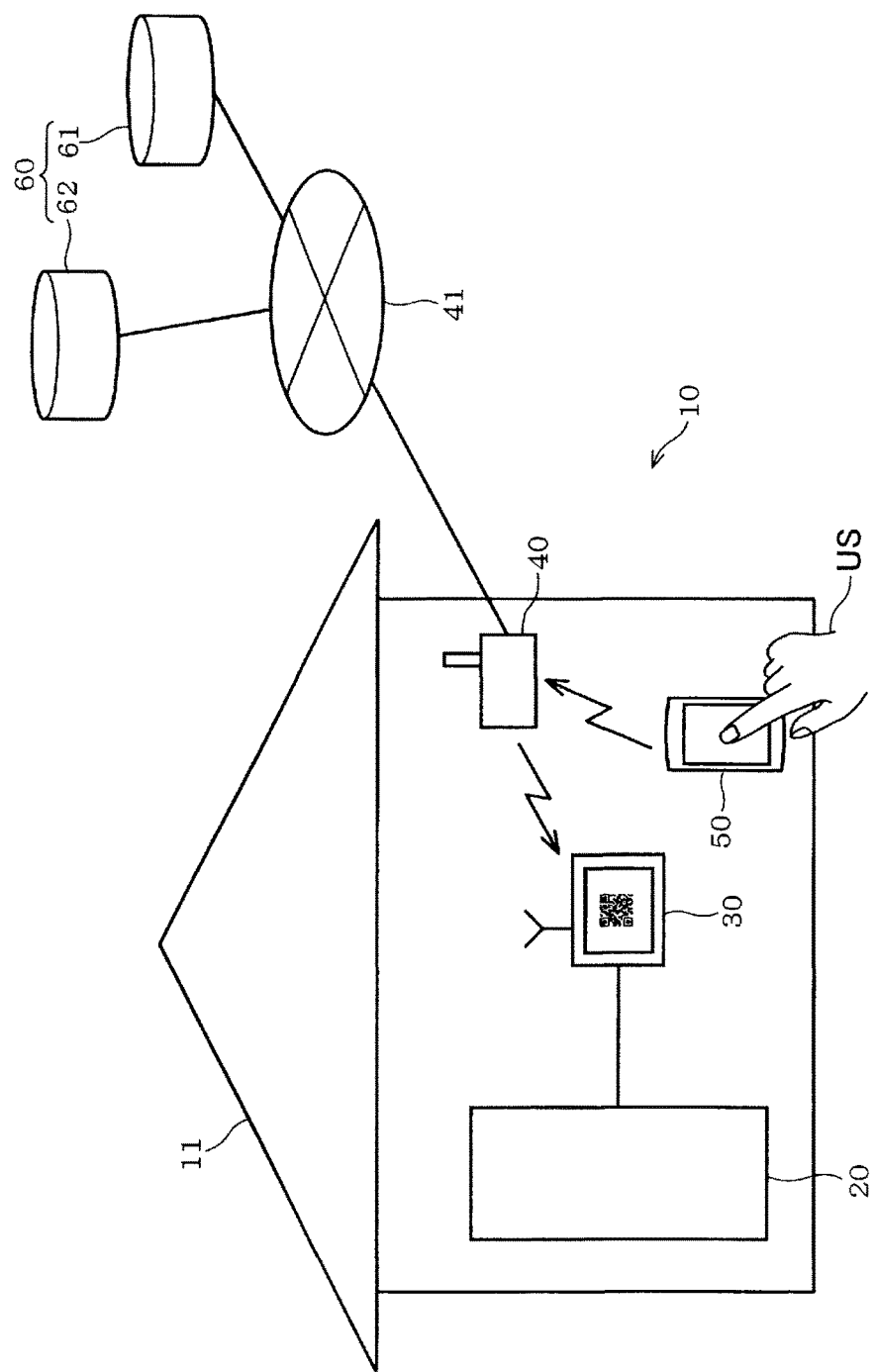

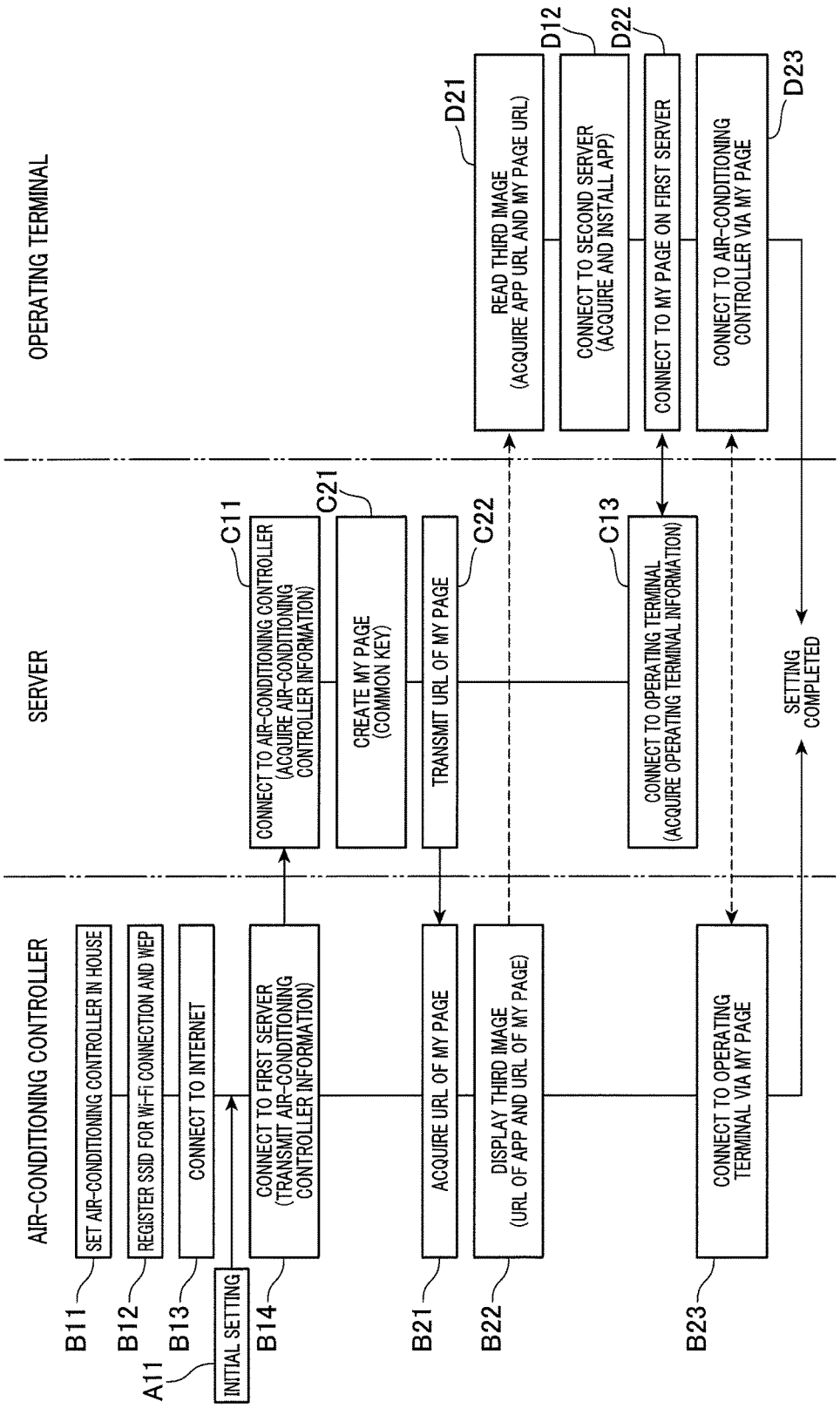

AIR-CONDITIONING CONTROL SYSTEM, AND METHOD FOR CONNECTING CONTROL DEVICE AND OPERATING TERMINAL

CROSS-REFERENCE TO RELATED APPLICATION

This application is based on and claims the benefit of priority from Japanese Patent Application No. 2013-272143, filed Dec. 27, 2013, the disclosure of which is incorporated herein in its entirety by reference.

BACKGROUND

Technical Field

The present invention relates to an air-conditioning control system, and a method for connecting a control device and an operating terminal.

Related Art

A technique for wirelessly connecting a control device and an operating terminal is known (see, for example, JP-A-2008-215637). The control device controls a certain piece of equipment. The operating terminal is not associated with the control device, and belongs to a user. In this technique, the control device is operated from the operating terminal via a server that is provided on the Internet.

For example, there is a central air-conditioning system that conditions a plurality of rooms in a house with a single air-conditioning unit. An air-conditioning controller serves as the core of the central air-conditioning system. In the air-conditioning system, the air-conditioning controller is operated by an operating terminal that is not associated with the central air-conditioning system, such as a smart phone that belongs to the user. The air-conditioning controller is operated via a cloud server, for example, that is provided on the Internet.

In this case, to connect the air-conditioning controller and the operating terminal via the server, an initial setting, such as the following, is conventionally performed. For example, first, the user acquires, from the server, a server connection identifier (ID) and a password. The user acquires the ID and the password over the Internet from a smartphone or a personal computer. Next, the user inputs the acquired ID and password into the air-conditioning controller. Thereafter, the air-conditioning controller accesses the server via the Internet. Verification of the ID and password is then performed. As a result, the user who has the ID is able to operate the air-conditioning controller via the cloud server, from an operating terminal, such as a smartphone.

Here, in view of security and the like, the ID and the password used for the setting are preferably composed of a large number of characters and digits. Therefore, in the conventional method, the user is required to directly input the ID and the password, which are composed of a large number of characters and digits, into the air-conditioning controller. The user is required to perform a bothersome operation. In addition, in accompaniment with size reduction of the air-conditioning controller, the size of a touch panel for performing input operations also becomes smaller. As a result, an issue arises in that the user is more likely to make operation errors when inputting predetermined information, such as the ID and the password.

SUMMARY

It is thus desired to provide an air-conditioning control system and a method for connecting a control device and an operating terminal in which, when an operating terminal and an air-conditioning controller serving a control device are connected via a server on the Internet, setting can be easily performed by omitting user operations related to the setting as much as possible.

An exemplary embodiment of the present disclosure provides an air-conditioning control system that includes: an air-conditioning controller that is connected to an air-conditioning unit and controls the air-conditioning unit; and a server that is connected to the air-conditioning controller by a communication network. The air-conditioning controller includes: a display unit that displays an image that includes setting information required to connect an operating terminal and the air-conditioning controller via the server; and a control unit that causes the operating terminal to acquire the image displayed in the display unit by capturing the image using an imaging device provided in the operating terminal and to connect to the air-conditioning controller via the server, based on the setting information included in the acquired image.

According to this configuration, the control unit of the air-conditioning controller displays, in the display unit of the air-conditioning controller, an image including setting information required to connect an operating terminal and the air-conditioning controller via the server. The operating terminal acquires the image displayed in the display unit by capturing the image using an imaging device such as a camera. Based on the setting information included in the acquired image, the operating terminal then connects to the air-conditioning controller via the server.

In other words, when the air-conditioning controller and the operating terminal are connected via a server, the initial setting is performed by the image displayed in the air-conditioning controller and the imaging device in the operating terminal. In other words, the information required for the initial setting is transmitted by the imaging device in the operating terminal capturing the image displayed in the air-conditioning controller.

Therefore, during the above-described initial setting, the user is merely required to capture the image displayed in the air-conditioning controller using the operating terminal. Therefore, the user themself is not required to directly input a server connection identifier (ID) and a password, which are composed of a large number of digits and characters, in the air-conditioning controller which has a small operating area. As a result, when the operating terminal and the air-conditioning controller are connected via a server that is provided on the Internet, setting can be easily performed by user operation related to the setting being omitted as much as possible.

In the exemplary embodiment, when a predetermined operation is performed on the air-conditioning controller, the control unit may display, in the display unit, a first image including a uniform resource locator (URL) indicating a location of an application software required for the operating terminal to connect to the air-conditioning controller via the server, and further may display, in the display unit, a second image including setting information required for the operating terminal to connect the air-conditioning controller via the server.

According to this configuration, the control unit of the air-conditioning controller displays, in the display unit, a first image when a predetermined operation is performed on the air-conditioning controller. The first image includes a uniform resource locator (URL) indicating a location of application software (referred to, hereinafter, as an app) required for the operating terminal to connect to the air-conditioning controller via a server. In other words, for example, the user operates the air-conditioning controller using a smartphone or the like that belongs to the user. In this case, the smartphone is not a dedicated terminal that is associated with the air-conditioning controller. Therefore, the user is required to acquire a specific app for controlling the air-conditioning controller and install the app onto the smartphone.

Conventionally, in such instances, the user themselves is required to search for the specific app from within the server. The server holds a collection of numerous different apps. Alternatively, the user is required to obtain the specific app by directly inputting, into the operating terminal, a URL indicating the location of the specific app that is written in the user manual for the air-conditioning controller or the like. However, such operations are very bothersome. Here, during the initial setting, the control unit of the air-conditioning controller displays, in the display unit, the first image that includes the URL indicating the location of the required app.

As a result, the user can acquire the URL indicating the location of the required app by acquiring the first image using the imaging device in the operating terminal. The user can then obtain the above-described specific app based on the URL. Therefore, the user themself is no longer required to search for the app. In addition, the user themselves is no longer required to input the URL of the app into the operating terminal. Therefore, installation of the app onto the operating terminal can be made easier. As a result, the initial setting can be easily performed by complicated operations being omitted.

In the exemplary embodiment, when a predetermined operation is performed on the air-conditioning controller, the control unit may display, in the display unit, a third image including: (i) a uniform resource locator (URL) indicating a location of an application software required for the operating terminal to connect to the air-conditioning controller via the server and (ii) setting information required for the operating terminal to connect the air-conditioning controller via the server.

According to this configuration, the control unit of the air-conditioning controller displays, in the display unit, a third image including the URL indicating a location of the required app and setting information required for the initial setting, when a predetermined operation performed on the air-conditioning controller. In other words, transmission of the URL of the app and the setting information required for connection is performed by a single image display operation. As a result, the number of times the user captures the image displayed in the air-conditioning controller can be reduced to only once, which is the minimum number of times. Therefore, the operation required for the initial setting can be made even easier.

In the exemplary embodiment, the setting information may include a common key, and the air-conditioning controller may receive operation from the operating terminal only when the air-conditioning controller and the operating terminal have the same common key.

According to this configuration, the setting information includes a common key. The air-conditioning controller receives operation from the operating terminal only when the air-conditioning controller and the operating terminal are provided with the same common key. In other words, ordinarily, the server connection ID and the password are set and managed using characters, such as numbers and the alphabet. Therefore, the server connection ID and the password are easily recognized through the human senses of sight and sound.

As a result, in a conventional method in which the user inputs the acquired server connection ID and password into the air-conditioning controller, a third party other than the intended user can acquire the server connection ID and the password by seeing or hearing the server connection ID and the password. In such instances, there is risk of unauthorized operation of the air-conditioning controller by a third party that has acquired the server connection ID and password.

Here, the setting information includes the common key. The air-conditioning controller does not receive operation from the operating terminal when the operating terminal does not have the same common key. In other words, only an operating terminal that has the same common key as the air-conditioning controller is able to operate the air-conditioning controller. As a result, the risk of the server connection ID and the password being leaked to a third party and the third party operating the air-conditioning controller can be eliminated. Security related to the operation of the air-conditioning controller can be increased.

In the exemplary embodiment, when the air-conditioning controller has received a predetermined operation, the server may newly issue a new common key and make the common key previous to the newly issued common key unusable.

According to this configuration, an external server issues a new common key when the air-conditioning controller has received a predetermined operation. In addition, the external server makes the common key previous to the newly issued common key unusable. In other words, when the user loses the operating terminal with which the initial setting has been performed or when the user of the air-conditioning unit including the air-conditioning controller changes, a new operating terminal and the air-conditioning controller are required to be connected to enable operation of the air-conditioning controller from the new operating terminal.

However, when a third party has acquired the lost operating terminal or when the previous user has not deleted the app or the like from the operating terminal, a person other than the user of the air-conditioning terminal is able to operate the air-conditioning controller using the previous operating terminal.

In other words, when the user of the operating terminal with which the initial setting has been previously performed and the current user of the air-conditioning unit are different people, there is risk of the air-conditioning controller being operated by someone other than the intended user of the air-conditioning unit, as a result of use of the operating terminal with which the initial setting has been performed.

However, the server issues a new common key and makes the common key previous to the newly issued common key unusable, when the air-conditioning controller receiving a predetermined operation. Therefore, even when the user of the operating terminal with which the initial setting has been performed and the current user of the air-conditioning unit are different people, the intended user can make the previous common key unusable and disable operation of the air-conditioning controller from the previous operating terminal. As a result, operation of the air-conditioning controller by a third party can be prevented. Security can be improved.

BRIEF DESCRIPTION OF THE DRAWINGS

In the accompanying drawings:

FIG. 3 is a flowchart of an initial setting according to the first embodiment;

FIG. 6 is a conceptual diagram of a state in which the air-conditioning controller is operated from the operating terminal according to the first embodiment;

FIG. 7 is a diagram according to a second embodiment that corresponds to FIG. 3;

DESCRIPTION OF THE EMBODIMENTS

An air-conditioning control system, and a method for connecting a control device and an operating terminal according to a plurality of embodiments will hereinafter be described with reference to the drawings. Constituent sections that are essentially the same among the embodiments are given the same reference numbers. Descriptions thereof are omitted.

First Embodiment

Figure 1:
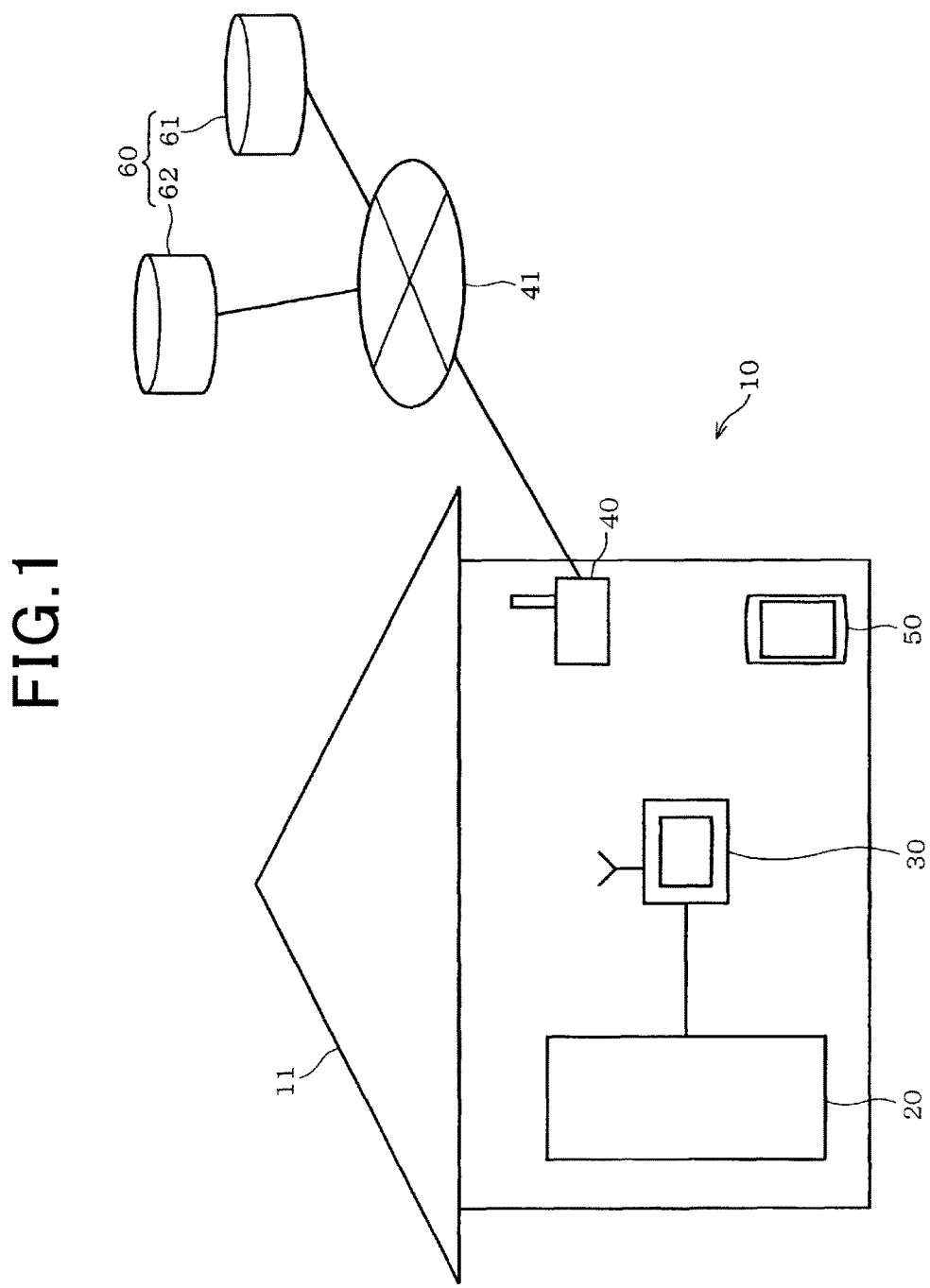
FIG. 1 is a conceptual diagram of a configuration of an air-conditioning control system according to a first embodiment.

As shown in FIG. 1, according to a first embodiment, an air-conditioning control system 10 is configured by an air-conditioning unit 20, an air-conditioning controller 30, an access point 40, an operating terminal 50, and a server 60. The air-conditioning unit 20, the air-conditioning controller 30, and the access point 40 are provided in a house 11. The server 60 is provided outside of the house 11. The operating terminal 50 is configured so as to be movable inside and outside of the house 11.

The air-conditioning unit 20 is configured by, for example, a heat pump-type heat exchanger (not shown). The heat pump-type heat exchanger has a compressor, an evaporator, heat exchanging fins, and the like. The air-conditioning unit 20 generates warm air and cold air. Although not shown in detail, the air-conditioning unit 20 is connected to each room in the house 11 by ducts. The warm air or the cold air generated by the air-conditioning unit 20 is distributed to each room in the house 11 through the ducts (not shown). In addition, the air-conditioning unit 20 includes a distribution mechanism for appropriately distributing the warm or cold air to each room. The distribution mechanism is configured by, for example, a damper. The damper opens and closes the path in the ducts. The amount of warm air or cold air supplied to each room in the house 11 is appropriately adjusted by the damper being opened and closed. As a result, each room in the house 11 is conditioned to an appropriate temperature.

The air-conditioning controller 30 is connected to the air-conditioning unit 20 and controls the air-conditioning unit 20. The air-conditioning controller 30 controls the opening and closing of the above-described damper (not shown), and the like. As a result, the air-conditioning controller 30 conditions each room in the house 11 to an appropriate temperature. In this case, the air-conditioning unit 20 and the air-conditioning controller 30 configure a central air-conditioning system. The central air-conditioning system conditions a plurality of rooms with a single air-conditioning unit. In addition, the air-conditioning controller 30 is connected to the Internet 41 that is a communication network via the access point 40. The access point 40 functions as a connecting means for connecting the air-conditioning controller 30 and the Internet 41.

Figure 2:
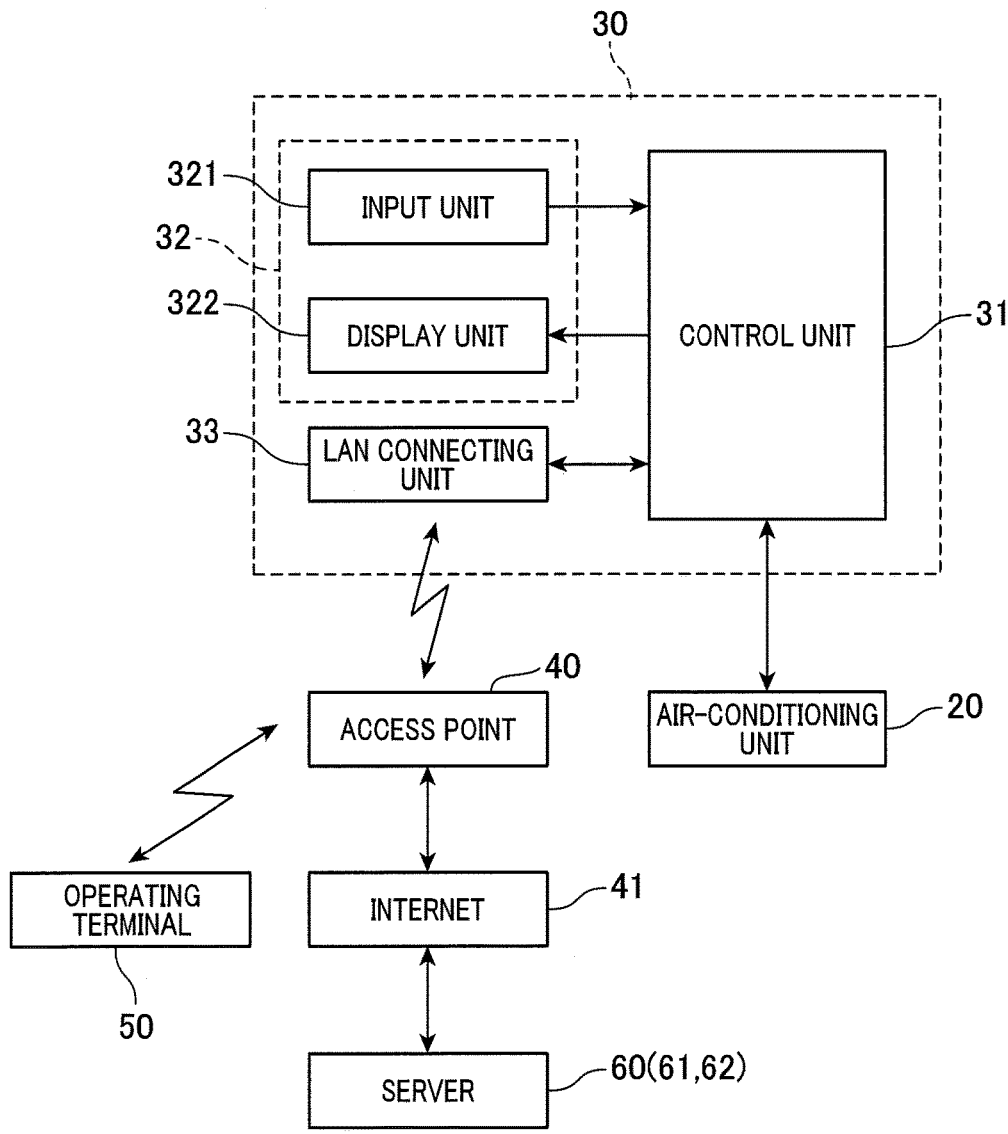
FIG. 2 is a block diagram of an air-conditioning controller and the related items thereof according to the first embodiment.

Specifically, as shown in FIG. 2, the air-conditioning controller 30 has a control unit 31, an operating panel 32, a local area network (LAN) connecting unit 33, and the like. The control unit 31 is configured by a microcomputer that has a central processing unit (CPU), a read-only memory (ROM), and a random access memory (RAM) (not shown). The control unit 31 controls an input unit 321, a display unit 322, and the like. In addition, the control unit 31 is connected to the air-conditioning unit 20 and performs the above-described control of the air-conditioning unit 20.

The operating panel 32 is configured by the input unit 321 and the display unit 322. The input unit 321 is, for example, a touch panel. The user US touch-operates the input unit 321, thereby inputting various operations. The display unit 322 is, for example, a liquid crystal display. The control unit 31 displays various pieces of information related to operation and setting in the display unit 322. For example, the control unit 31 displays the setting details and operating state of the air-conditioning unit 20. The input unit 321 and the display unit 322 are provided in an overlapping manner. The LAN connecting unit 33 connects to the access point 40 by LAN. In this case, the LAN connecting unit 33 may connect to the access point 40 by wired LAN or wireless LAN conforming to wireless fidelity (Wi-Fi) standards.

The access point 40 is a so-called Wi-Fi router, that is, a wireless LAN router generally available on the market. The access point 40 provides a LAN connection function and a router function. In other words, in the LAN connection function, the access point 40 serves as a relay point for data transfer between the air-conditioning controller 30 and the operating terminal 50. The access point 40 thereby connects the air-conditioning controller 30 and the operating terminal 50. In addition, in the router function, the access point 40 connects the air-conditioning controller 30 and the Internet, as well as the operating terminal 50 and the Internet. According to the present embodiment, the access point 40 is provided separately from the air-conditioning controller 30. However, the access point 40 may be configured integrally with the air-conditioning controller 30.

The operating terminal 50 is an operating terminal that is not associated with the air-conditioning controller 30. For example, the operating terminal 50 is a multifunctional mobile terminal, such as a so-called smart phone or a tablet personal computer (PC), that is owned by the user US. The operating terminal 50 is capable of wirelessly communicating with other pieces of equipment. The operating terminal 50 is connected to the access point 40 by Wi-Fi. The operating terminal 50 is connected to the Internet 41 and the air-conditioning controller 30, via the access point 40. In addition, a camera that is an imaging device is provided within the operating terminal 50. The operating terminal 50 is capable of capturing an image with the camera to recognize and read an image of a two-dimensional (2D) code, such as a Quick Response (QR) code (registered trademark). The captured image is not limited to the 2D code. For example, dot matrix data other than the 2D code may be also used as the captured image. The dot matrix data can be easily corrected by interpolation of data, even when the captured image is rough image.

The server 60 is an external server that is provided on the Internet 41. The server 60 is referred to as a database server, a web server, a cloud server, or the like. The server 60 is composed of, for example, a first server 61 and a second server 62. The first server 61 has programs required by the operating terminal 50 to control the air-conditioning controller 30 via the first server 61. The operating terminal 50 has a certain app. The second server 62 has app data required by the operating terminal 50 to connect to and operate the air-conditioning controller 30 via the first server 61.

In this case, the first server 61 is referred to as a so-called management server. The second server 62 is referred to as a so-called app storage server. The first server 61 and the second server 62 may be separate servers. Alternatively, the first server 61 and the second server 62 may be integrated. In other words, the first server 61 and the second server 62 may be provided in the same location or in different locations, as long as the first server 61 and the second server 62 are located on the Internet 41. In addition, the first server 61 and the second server 62 may be operated by the manufacturer of the air-conditioning controller 30. Alternatively, the first server 61 and the second server 62 may be operated by a party other than the manufacturer of the air-conditioning controller 31. In addition, the first server 61 and the second server 62 are not required to be operated by the same operator, and may be operated by different operators.

Next, an initial setting for enabling the operating terminal 50 to operate the air-conditioning controller 30 via the first server 61 will be described.

1. Connection Between the Air-Conditioning Controller 30 and the Access Point 40

Here, it is presumed that the access point 40 is already set in the house 11 and connected to the Internet 41. The user US purchases the air-conditioning unit 20 and the air-conditioning controller 30. As shown in FIG. 1, the user US then sets the air-conditioning unit 20 and the air-conditioning controller 30 in the house 11. The user US connects the air-conditioning unit 20 and the air-conditioning controller 30 (step B11 in FIG. 3).

Next, as shown in step B12, the user US inputs, into the air-conditioning controller 30, a service set identifier (SSID; access point identifier) for Wi-Fi connection that is provided to the access point 40. The user US also inputs, into the air-conditioning controller 30, a wired equivalent privacy (WEP) key that conforms to WEP standards. The user US thereby registers the SSID and the WEP key in the air-conditioning controller 30. The user US inputs the SSID and the WEP key by operating the input unit 321 of the air-conditioning controller 30.

The WEP key ensures privacy of the communication between the access point 40 and the air-conditioning unit 20. In other words, the WEP key is used as a security measure. Therefore, encryption technology used for the security measure is not limited to the above-described WEP standards, and may meet standards such as Wi-Fi protected access (WPA) or WPA2.

Next, the air-conditioning controller 30 establishes connection with the access point 40 based on the SSID and the WEP key inputted at step B12 (step B13). As a result, the air-conditioning controller 30 becomes capable of connecting to the Internet 41 via the access point 40.

2. Connection Between the Air-Conditioning Controller 30 and the First Server 61

Figure 4A:
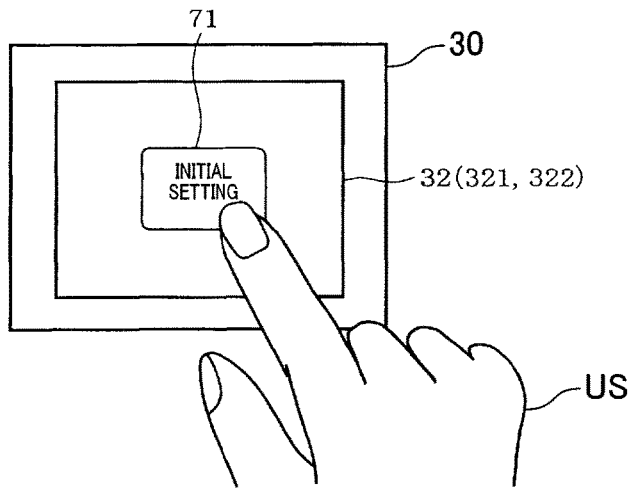
FIGS. 4A to 4C are diagrams of the display content in a display unit of the air-conditioning controller during the initial setting according to the first embodiment, in which the display content is shown chronologically, in order from FIGS. 4A to 4C.

Then, as shown in FIG. 4A, the control unit 31 of the air-conditioning controller 30 displays a first icon 71 in the display unit 322. The first icon 71 includes the characters "Initial Setting". As shown in FIG. 4A, the user US touch-operates the first icon 71 (step A11 in FIG. 3). Then, the control unit 31 transmits air-conditioning controller information to the first server 61, via the access point 40 and the Internet 41 (step B14). The air-conditioning controller information includes, for example, a unique ID of the air-conditioning controller 30, or in other words, the air-conditioning controller ID, and information related to the types of apps supported by the air-conditioning controller 30.

The first server 61 acquires the air-conditioning controller information from the air-conditioning controller 30 (step C11). The first server 61 then issues a server connection ID, a password (Pass), and a common key. The first server 61 transmits the issued server connection ID, password, and common key to the air-conditioning controller 30 (step C12). The server connection ID, the password, and the common key are newly issued each time the first icon 71 is touch-operated. Then, when the server connection ID, the password, and the common key are newly issued, the first server 61 and the air-conditioning controller 30 make the previous server connection ID, password, and common key unusable.

3. Installation of an App onto the Operating Terminal 50

Figure 4B:
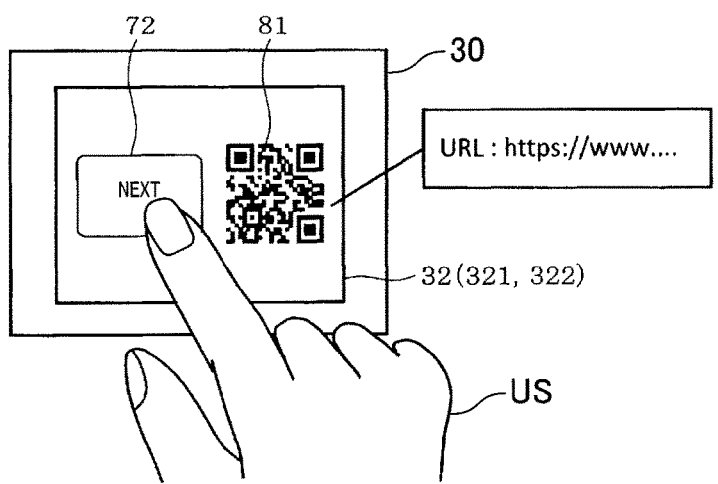

The control unit 31 of the air-conditioning controller 30 acquires the server connection ID, the password, and the common key from the first server 61 (step B15). Then, as shown in FIG. 4B, the control unit 31 displays a first image 81 and a second icon 72 in the display unit 322 (step B16 in FIG. 3). The first image 81 is a two-dimensional code acquired by converting information, such as numerical values and characters, into a two-dimensional image. For example, the two-dimensional code is a QR code (registered trademark). The first image 81 includes a uniform resource locator (URL) as information required for the initial setting. The URL indicates the location of an app. In addition, the second icon 72 includes, for example, the characters "Next".

In this case, the control unit 31 of the air-conditioning controller 30 displays the first image 81 in the display unit 322 when a predetermined operation has been performed on the air-conditioning controller 30, i.e., when the first icon 71 has been touch-operated at step A11 in FIG. 3 (step B16). Then, in this case, the control unit 31 runs a computer program, thereby functioning as a display means in cooperation with the display unit 322.

The display means is not required to be configured so that the control unit 31 and the display unit 322 work in cooperation. For example, the display means may be actualized by dedicated hardware provided in the display unit 322. In addition, the predetermined operation referred to herein is not limited to a direct operation of the input unit 321 of the air-conditioning controller 30. For example, the predetermined operation may be the power of the air-conditioning controller 30 being turned ON for the first time. Alternatively, the predetermined operation may be the power of the air-conditioning controller 30 being turned ON again.

Figure 5:
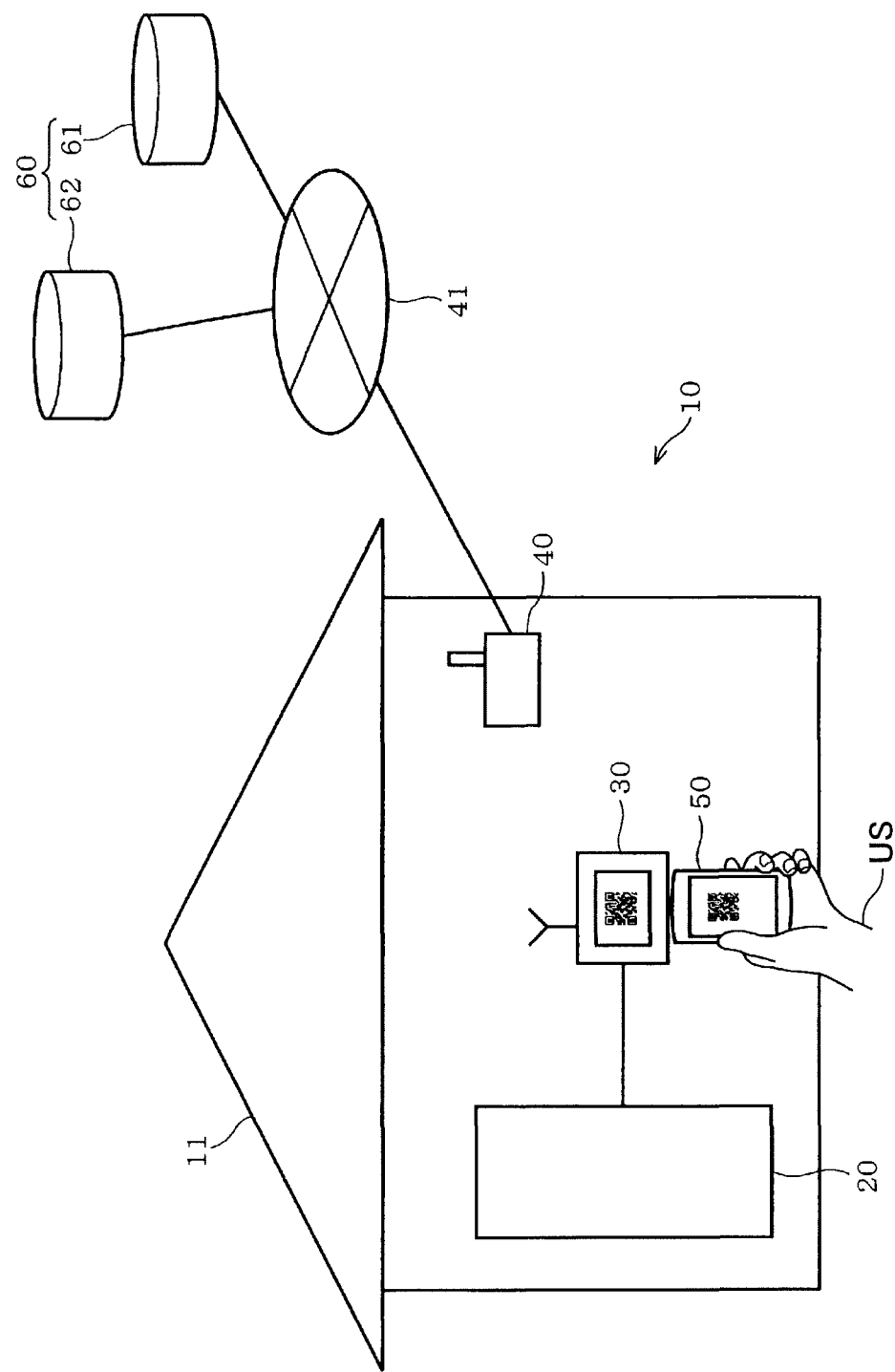
FIG. 5 is a conceptual diagram of a state in which an image displayed in the air-conditioning controller is read by an operating terminal according to the first embodiment.

Next, as shown in FIG. 5, the user US uses the camera function of the operating terminal 50. The user US captures the first image 81 displayed in the display unit 322 of the air-conditioning controller 30, thereby making the operating terminal 50 read the image. As a result, the operating terminal 50 acquires the information included in the first image 81, or in other words, the URL indicating the location of the app (step D11 in FIG. 3). In this case, the URL indicating the location of the app indicates the location of an app stored in the second server 62.

Next, the operating terminal 50 connects to the second server 62 based on the URL acquired from the first image 81 (step D12). The operating terminal 50 then downloads the required app from the second server 62 and installs the downloaded app onto the operating terminal 50 (step D12). In this case, the operating terminal 50 may automatically perform step D12 after performing step D11. Alternatively, the operating terminal 50 may perform step D12 when the user US has performed an operation of some kind on the operating terminal 50 after step D11 has been performed, for example, when the user US operates an "Install App" button (not shown).

4. Connection Between the Operating Terminal 50 and the First Server 61

Figure 4C:
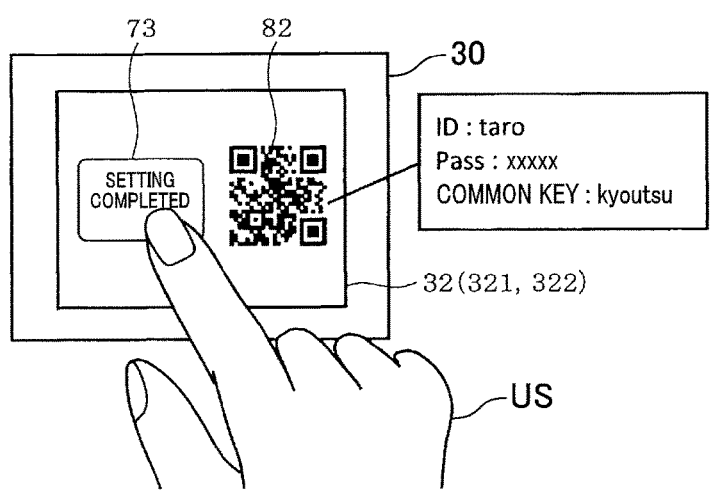

After the app is installed onto the operating terminal 50, as shown in FIG. 4B, the user US touch-operates the second icon 72 displayed in the operating panel 32 of the air-conditioning controller 30 (step A12 in FIG. 3). As shown in FIG. 4C, the control unit 31 of the air-conditioning controller 30 then displays a second image 82 and a third icon 73 in the display unit 322 (step B17 in FIG. 3). In a manner similar to the first image 81, the second image 82 is a two-dimensional code acquired by converting information, such as numerical values and characters, into a two-dimensional image. For example, the two-dimensional code is a QR code (registered trademark). The second image includes the server connection ID, the password, and the common key as setting information required for the initial setting. The third icon 73 includes, for example, the characters "Setting Completed".

In this case, the control unit 31 of the air-conditioning controller 30 displays the second image 82 in the display unit 322 when a predetermined operation has been performed on the air-conditioning controller 30, i.e., when the second icon 72 has been touch-operated at step A12 in FIG. 3 (step B17). Then, in this case, the control unit 31 runs a computer program, thereby functioning as a display means in cooperation with the display unit 322.

The display means is not required to be configured so that the control unit 31 and the display unit 322 work in cooperation. For example, the display means may be actualized by dedicated hardware provided in the display unit 322. In addition, the predetermined operation referred to herein is not limited to a direct operation of the input unit 321 of the air-conditioning controller 30. For example, the predetermined operation may be the elapse of a certain period without the input unit 321 being operated, after the control unit 31 has displayed the second image 82.

Next, in a manner similar to that at step D11 in FIG. 3, the user US uses the camera function of the operating terminal 50. The user US captures the second image 82 displayed in the display unit 322 of the air-conditioning controller 30, thereby making the operating terminal 50 read the second image 82 (step D13). As a result, the operating terminal 50 acquires the setting information included in the second image 82, or in other words, information such as the server connection ID, the password, and the common key (step D13 in FIG. 3).

Thereafter, the operating terminal 50 connects to the first server 61 using the server connection ID and the password acquired at step D13 (step D14). As a result, the connection between the operating terminal 50 and the first server 61 is established. After connecting to the operating terminal 50, the first server 61 acquires operating terminal information from the operating terminal 50 (step C13). The operating terminal information includes information such as the ID and Internet Protocol (IP) address of the operating terminal 50, whether or not an app is installed, and whether or not the operating terminal 50 supports operation of the air-conditioning controller 30.

Then, the operating terminal 50 connects to the air-conditioning controller 30 via the first server 61 (step B18). At this time, the control unit 31 of the air-conditioning controller 30 collates the common key provided to the air-conditioning controller 30 itself and the common key provided to the operating terminal 50. When determined that the common keys match, the control unit 31 receives commands from the operation terminal 50 via the first server 61. In this way, the operating terminal 50 connects to the air-conditioning controller 30 via the first server 61, over the Internet 41. On the other hand, when determined that the common keys do not match, the control unit 31 does not receive operation from the operating terminal 50 via the first server 61.

Thereafter, as shown in FIG. 4C, the user US touch-operates the third icon 73. The control unit 31 then displays a screen in the display unit 322. The screen is that which is displayed in a normal operation state. As a result, as shown in FIG. 6, the operating terminal 50 becomes capable of operating the air-conditioning controller 30 via the first server 61, over the Internet 41.

The collation of the common keys provided to the air-conditioning controller 30 and the operating terminal 50 may be performed by the air-conditioning controller 30 or by the first server 61. In addition, for example, the screen shown in FIG. 4C may be switched to the screen for normal operation as a result of the connection between the operating terminal 50 and the air-conditioning controller 30 being established. Alternatively the screen shown in FIG. 4C may be switched to the screen for normal operation as a result of the input unit 321 not being operated for a certain period after the second image 82 has been displayed.

According to the first embodiment, the control unit 31 and the display unit 322 of the air-conditioning controller 30 function as the display means. During the initial setting, the control unit 31 displays the first image 81 and the second image 82 in the display unit 322. The first image 81 and the second image 82 include the setting information required for connection between the operating terminal 50 and the air-conditioning controller 30 via the first server 61. The operating terminal 50 uses the camera provided in the operating terminal 50 to capture and acquire the first image 81 and the second image 82. Then, the operating terminal 50 connects to the air-conditioning controller 30 via the first server 61 based on the setting information included in the acquired first image 81 and second image 82.

As a result, the information required for the initial setting, or in other words, the setting information is transmitted between the air-conditioning controller 30 and the operating terminal 50, via the first image 81 and the second image 82. Therefore, during the initial setting, the user US is merely required to use the operating terminal 50 to capture the first image 81 and the second image 82 displayed in the air-conditioning controller 30. Therefore, the user US themselves is not required to directly input the server connection ID and the password, which are composed of a large number of characters and digits, into the air-conditioning controller 30 which has a small operating area. As a result, when the operating terminal 50 and the air-conditioning controller 30 are connected via the first server 61 that is provided on the Internet 41, the initial setting can be easily performed by user operation related to the initial setting being omitted as much as possible.

When a predetermined operation is performed on the air-conditioning controller 30, that is, when the first icon 71 is touch-operated in this case, the control unit 31 displays the first image 81 in the display unit 322. The first image 81 includes, for example, the URL of a required app. As a result, the user US can acquire the URL indicating the location of the required app by capturing and acquiring the first image 81 using the camera in the operating terminal 50. The user US can then acquire the app based on the URL. Therefore, the user US themselves is not required to search for the app. In addition, the user US themselves is not required to input the URL of the app into the operating terminal 50. Therefore, installation of the app onto the operating terminal 50 can be facilitated. As a result, the initial setting can be easily performed with complicated operations being omitted.

When a predetermined operation is performed on the air-conditioning controller 30, that is, when the second icon 72 is touch-operated in this case, the control unit 31 connects to the first server 61 and acquires the server connection ID and the password. The control unit 31 then displays the second image 82 in the display unit 322. The second image 82 includes, for example, the server connection ID, the password, and the common key as the setting information.

As a result, the user US is not required to acquire the server connection ID and the password by connecting to the first server 61 using a smartphone or a personal computer. Furthermore, the user US is not required to input the acquired ID and password into the air-conditioning controller 30. Therefore, the user US is not required to perform a bothersome operation, such as directly inputting an ID and a password composed of a large number of characters and digits into the air-conditioning controller 30. The initial setting can be performed with further ease.

The setting information in the second image 82 includes the common key. When the common keys provided to the air-conditioning controller 30 and the operating terminal 50 match, the air-conditioning controller 30 receives operation from the operating terminal 50 via the first server 61. When the first icon 71 including the characters "Initial Setting" is touch-operated, the air-conditioning controller 30 issues a new common key. In addition, the air-conditioning controller 30 makes the common key previous to the newly issued common key unusable.

As a result, even when the owner of the operating terminal 50 with which the initial setting has been previously performed and the current user of the air-conditioning controller 30 are different people, operation of the air-conditioning controller 30 is no longer able to be performed using the previous operating terminal 50. In other words, the common key provided to the previous operating terminal 50 and the common key currently provided to the air-conditioning controller 30 do not match. Therefore, the air-conditioning controller 30 does not receive operation from the previous operating terminal 50. As a result, a third party can be prevented from operating the air-conditioning controller 30. Thus, security can be improved.

The predetermined operation referred to herein is not limited to a direct operation performed on the input unit 321 of the air-conditioning controller 30. For example, the predetermined operation may be the power of the air-conditioning controller 30 being turned ON for the first time. Alternatively, the predetermined operation may be the power of the air-conditioning controller 30 being turned ON again.

Second Embodiment

A second embodiment will be described with reference to FIG. 7 and FIGS. 8A and 8B. According to the above-described first embodiment, transmission of information required for the initial setting between the air-conditioning controller 30 and the operating terminal 50 is performed in two separate operations. That is, the first image 81 is displayed and read. In addition, the second image 82 is displayed and read. On the other hand, according to the second embodiment, the transmission of information required for the initial setting between the air-conditioning controller 30 and the operating terminal 50 is performed by a single display and read-out operation of a third image 83 shown in FIG. 8B.

Figure 8A:
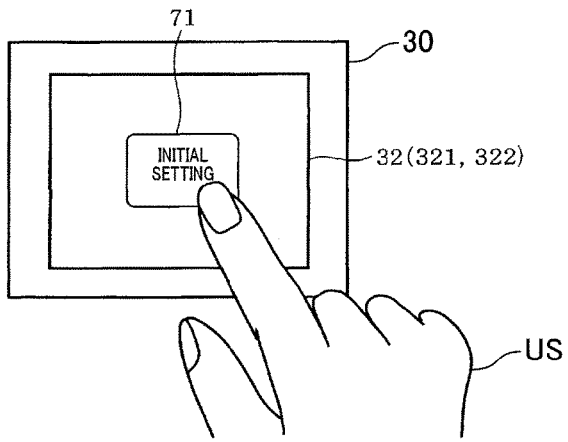
FIGS. 8A and 8B are diagrams according to the second embodiment that corresponds to FIGS. 4A to 4C.
Figure 8B:
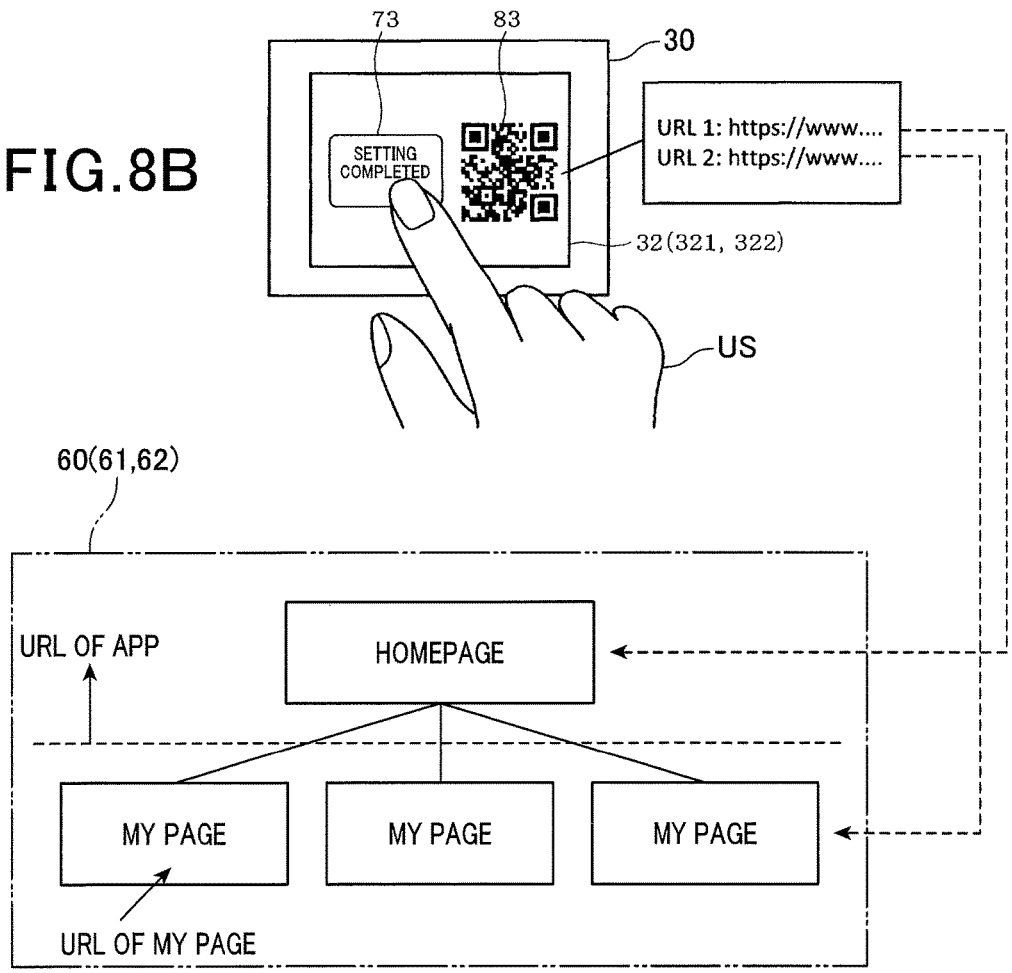

In other words, in a manner similar to that according to the first embodiment, according to the second embodiment as well, the user US touches the first icon 71 as shown in FIG. 8A (step A11 in FIG. 7). Then, step B14 and step C11 are performed. At step C11 in FIG. 7, the first server 61 acquires the air-conditioning controller information from the air-conditioning controller 30. The first server 61 then creates therein a My Page (corresponding to a user-dedicated page) that is dedicated to the air-conditioning controller 30 (step C21). The My Page is unique to a single common key. Therefore, a new My Page is created each time the initial setting is performed, or in other words, each time a new common key is issued.

The My Page is described with reference to FIG. 8B. A homepage (website) browsed on the Internet 41 is built in the server 60 (the first server 61 and the second server 62) on the Internet 41. The My Page (user-dedicated page) dedicated to only each user US is built in the homepage. The My Page is set such that: i) using URL of app allows the operating terminal 50 to access the homepage of the server 60 but not to access the My Page; and ii) using URL of the My Page allows the operating terminal 50 to access the My Page and to operate the air-conditioning controller 30, e.g., to control the air-conditioning controller 30, through the My Page.

In this case, the operating terminal 50 can operate the air-conditioning controller 30 via the first server 61 only through the My Page that includes the latest common key. In other words, according to the present embodiment, the My Page serves as a replacement for the server connection ID and the password according to the first embodiment. In this case, the URL indicating the location of the app and the URL indicating the location of the My Page are information required for the initial setting.

Next, the first server 61 transmits the URL of the My Page created at step C21 to the air-conditioning controller 30 (step C22). After acquiring the URL of the My Page (step B21), the control unit 31 of the air-conditioning controller 30 makes the display unit 322 display a third icon 73 and a third image 83 as shown in FIG. 8B (step B22). The third image 83 includes the URL of the app (URL1) and the URL of the My Page (URL2).

Next, in a manner similar to that at step D11 in FIG. 3, the user US uses the camera function of the operating terminal 50. The user US captures the third image 83 displayed in the display unit 322 of the air-conditioning controller 30, thereby making the operating terminal 50 read the image (step D21 in FIG. 7). As a result, the operating terminal 50 acquires the information included in the third image 83, or in other words, the URL indicating the location of the app (URL1) and the URL indicating the location of the My Page (URL2) (step D21). Next, at step D12, the operating terminal 50 connects to the second server 62, and downloads and installs the required app based on the URL of the app (URL1).

Subsequently, the operating terminal 50 connects to the My Page on the first server 61 based on the URL of the My Page (URL2) (step D22). Next, the first server 61 acquires the operating terminal information from the operating terminal 50 connected to the My Page on the first server 61 (step C13). Then, the operating terminal 50 that is connected to the My Page on the first server 61 connects to the air-conditioning controller 30 (step D23 and step B23). In this way, the operating terminal 50 becomes capable of operating the air-conditioning controller 30, via the Internet 41 and the first server 61.

As a result, the air-conditioning controller 30 displays the third image 83 when a predetermined operation is performed on the air-conditioning controller 30, that is, the first icon 71 is touch-operated at step A11 in this case. The third image 83 includes the URL indicating the location of the required app and the URL of the My Page. In this way, according to the present embodiment, transmission of the setting information required for the initial setting is performed by a single image display operation. As a result, the number of times that the user US captures an image displayed in the display unit 322 of the air-conditioning controller 30 can be reduced to only once, which is the minimum number of times. Therefore, the operation required for the initial setting can be made even easier.

Other Embodiments

The above-described present disclosure is not limited to the above-described embodiments. The present disclosure can be applied to various embodiments without departing from the spirit of the disclosure.

The operating terminal 50 is merely required to be an information processing terminal that is provided with at least a communication function that enables communication with another piece of equipment and a camera that is capable of capturing images. The mode and size of the operating terminal 50 are not limited. In other words, the operating terminal 50 is not limited to a multifunctional mobile terminal, such as a so-called smartphone or tablet PC.

For example, the operating terminal 50 may be a mobile phone or a personal handy-phone system (PHS). Alternatively, for example, the operating terminal 50 may be a so-called wearable device that can be attached to the body in the form of a pair of glasses or a wristwatch. In addition, the operating terminal 50 may be a remote controller that is sold separately from the air-conditioning controller 30 or the like. The operating terminal 50 may be operated inside and outside the house 11. A single air-conditioning unit 20 may be connected to the air-conditioning controller 30. Alternatively, a plurality of air-conditioning units 20 may be connected to the air-conditioning controller 30.

In addition, according to the above-described embodiments, the air-conditioning controller 30 is a control device that controls a connected piece of equipment, or in other words, the air-conditioning unit 20 and is connected to the Internet 41. The operating terminal 50 is connected to the control device 30 via the server 60 on the Internet 41 and issues operating commands to the control device 30. The control device 30 displays images including setting information required for connecting the operating terminal 50 and the control device 30 in the display unit 322 of the control device 30 or a display device, such as a monitor, that is used integrally the control device.

In addition, the method for connecting a control device and an operating terminal via a server according to the above-described embodiments can also be applied in fields other than the air-conditioning controller. For example, the method for connecting a control device and an operating terminal via a server can also be applied in various fields including televisions, video recording/playback apparatuses, such as video and digital versatile disc (DVD) players and hard disk players, and even telephones.

Figure 9:
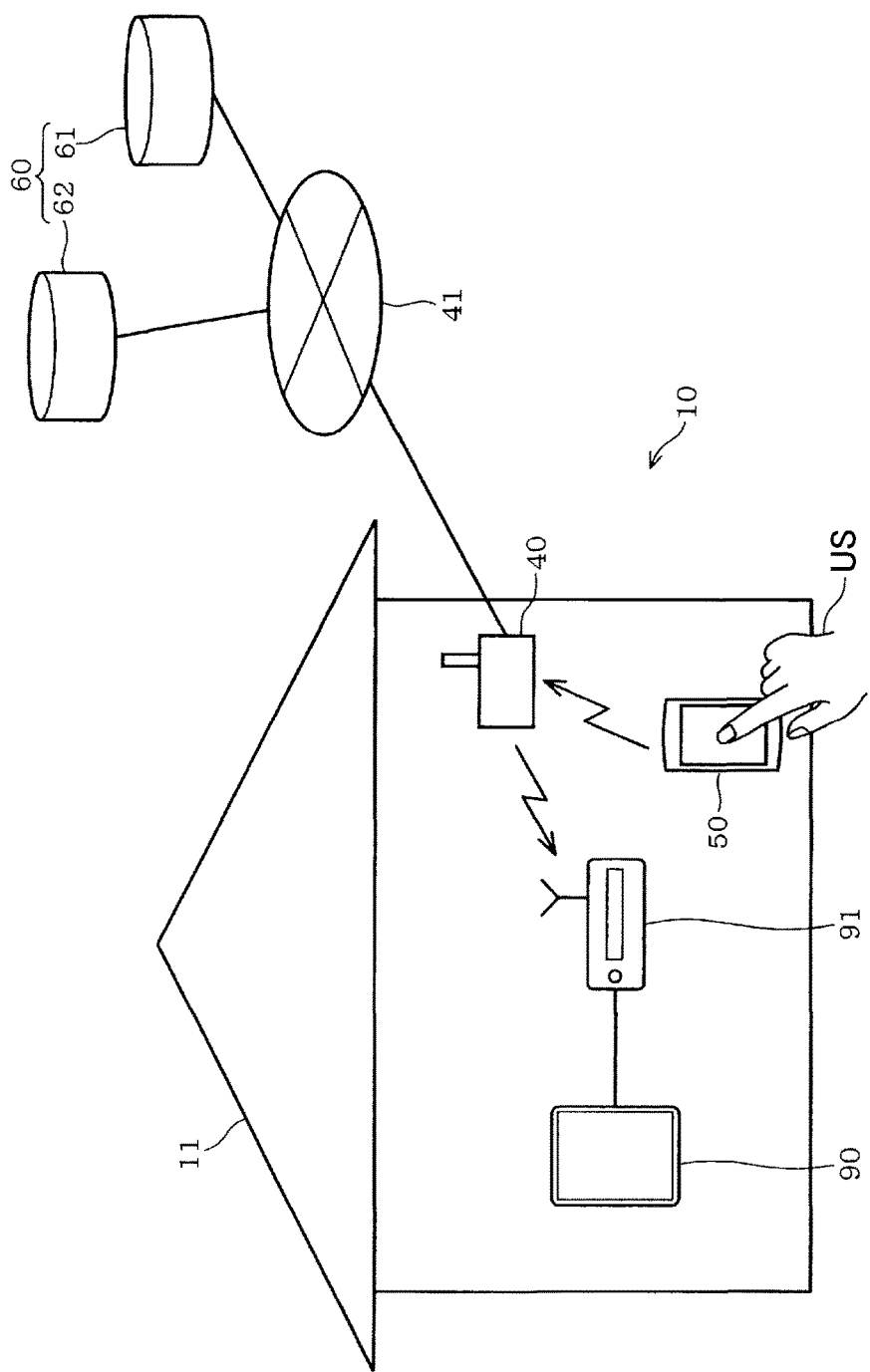
FIG. 9 is a diagram according to another embodiment that corresponds to FIG. 1.

For example, as shown in FIG. 9, the control device can be configured by a video recording/playback apparatus 91, instead of the air-conditioning controller 30 according to the above-described embodiments. The video recording/playback apparatus 91 is, for example, a DVD player that is connected to a monitor 90, such as a television receiver.

In this case, during the initial setting, the images 81, 82, and 83 according to the above-described embodiments are displayed on the monitor 90. In other words, in this case, the video recording/playback apparatus 91 functions as the control device and the display means. The monitor 90 functions as the display means. The user US performs the above-described initial setting on the operating terminal 50 that is not associated with either the monitor 90 or the video recording/playback apparatus 91. As a result, the operating terminal 50 becomes capable of operating the video recording/playback apparatus 91 and the monitor 90, via the Internet 41 and the first server 61.

What is claimed is:

1. An air-conditioning control system comprising:
an air-conditioning controller that is connected to an air-conditioning unit and controls the air-conditioning unit; and
a server that is connected to the air-conditioning controller by a communication network,
the air-conditioning controller comprising:
a display unit that displays an image that includes setting information required to connect an operating terminal and the air-conditioning controller via the server; and
a control unit that causes the operating terminal to acquire the image displayed in the display unit by capturing the image using an imaging device provided in the operating terminal and to connect to the air-conditioning controller via the server, based on the setting information included in the acquired image wherein:
when a predetermined operation is performed on the air-conditioning controller, the control unit displays, in the display unit, a first image including a uniform resource locator (URL) indicating a location of application software required for the operating terminal to connect to the air-conditioning controller via the server, and also displays, on the display unit, a second image including setting information required for the operating terminal to connect the air-conditioning controller via the server;

the setting information includes a common key;

the air-conditioning controller receives commands from the operating terminal only when the air-conditioning controller and the operating terminal have the same common key; and when the air-conditioning controller has received the predetermined operation, the server issues a new common key and makes the common key previous to the newly issued common key unusable.

2. The air-conditioning control system according to claim 1, wherein the image is configured by a two-dimensional code.

3. A device control system comprising:

a controller that is connected to a device and controls the device; and a server that is connected to the controller by a communication network, the controller comprising:

a display unit that displays an image that includes setting information required to connect an operating terminal and the controller via the server; and a control unit that causes the operating terminal to acquire the image displayed in the display unit by capturing the image using an imaging device provided in the operating terminal and to connect to the controller via the server, based on the setting information included in the acquired image wherein:

when a predetermined operation is performed on the controller, the control unit displays, in the display unit, a first image including a uniform resource locator (URL) indicating a location of application software required for the operating terminal to connect to the controller via the server, and also displays, on the display unit, a second image including setting information required for the operating terminal to connect to the controller via the server;

the setting information includes a common key;

the controller receives commands from the operating terminal only when the controller and the operating terminal have the same common key; and when the controller has received the predetermined operation, the server issues a new common key and makes the common key previous to the newly issued common key unusable.

4. The device control system according to claim 3, wherein:

the device is a monitor; and the controller is a video recording and playback apparatus that is connected to the monitor and controls operation of the monitor.

5. A method for connecting a control device and an operating terminal, the control device controlling a device connected to the control device, the control device being connected to a communication network, the operating terminal being connected to the control device by a server on a communication network and performing an operation instruction for the control device, the method comprising:

displaying, by the control device, in a display unit of the control device or a display device that is used integrally the control device, an image including setting information required to connect the operating terminal and an air-conditioning controller via the server; and causing, by the control device, the operating terminal to acquire the image displayed in the display unit or the display device by capturing the image using an imaging device provided in the operating terminal and to connect to the control device based on the setting information included in the acquired image wherein:

when a predetermined operation is performed on the control device, the control device displays, in the display unit, a first image including a uniform resource locator (URL) indicating a location of application software required for the operating terminal to connect to the air-conditioning controller via the server, and also displays, in the display unit, a second image including setting information required for the operating terminal to connect to the air-conditioning controller via the server;

the setting information includes a common key;

the air-conditioning controller receives commands from the operating terminal only when the air-conditioning controller and the operating terminal have the same common key; and when the air-conditioning controller has received the predetermined operation, the server issues a new common key and making the common key previous to the newly issued common key unusable.

6. An air-conditioning control system comprising:

an air-conditioning controller that is connected to an air-conditioning unit and controls the air-conditioning unit; and a server that is connected to the air-conditioning controller by a communication network, the air-conditioning controller comprising:

a display unit that displays an image that includes setting information required to connect an operating terminal and the air-conditioning controller via the server; and a control unit that causes the operating terminal to acquire the image displayed in the display unit by capturing the image using an imaging device provided in the operating terminal and to connect to the air-conditioning controller via the server, based on the setting information included in the acquired image wherein:

when a predetermined operation is performed on the air-conditioning controller, the control unit displays, in the display unit, a third image including: (i) a uniform resource locator (URL) indicating a location of an application software required for the operating terminal to connect to the air-conditioning controller via the server and (ii) setting information required for the operating terminal to connect the air-conditioning controller via the server;

the setting information includes a common key;

the air-conditioning controller receives commands from the operating terminal only when the air-conditioning controller and the operating terminal has the same common key; and when the air-conditioning controller has received the predetermined operation, the server issues a new common key and makes the common key previous to the newly issued common key unusable.

* * * * *